(12) United States Patent
Ji et al.

(10) Patent No.: US 10,696,376 B2
(45) Date of Patent: Jun. 30, 2020

(54) FOLDABLE WING AND ROTOCRAFT AND GLIDER USING THE SAME

(71) Applicants: Lanping Ji, Guangdong (CN); Xu Wang, Guangdong (CN)

(72) Inventors: Lanping Ji, Guangdong (CN); Xu Wang, Guangdong (CN)

(*) Notice: Subject to any disclaimer, the term of this patent is extended or adjusted under 35 U.S.C. 154(b) by 532 days.

(21) Appl. No.: 15/479,301

(22) Filed: Apr. 5, 2017

(65) Prior Publication Data
US 2017/0283035 A1    Oct. 5, 2017

(30) Foreign Application Priority Data

Apr. 5, 2016 (CN) .................. 2016 2 0324195 U
Sep. 3, 2016 (CN) ....................... 2016 1 0830956

(51) Int. Cl.
*B64C 3/54* (2006.01)
*B64C 3/56* (2006.01)
(Continued)

(52) U.S. Cl.
CPC .............. *B64C 3/56* (2013.01); *B64C 27/26* (2013.01); *B64C 31/032* (2013.01); *B64C 39/024* (2013.01); *B64C 2201/028* (2013.01); *B64C 2201/084* (2013.01); *B64C 2201/102* (2013.01); *B64C 2201/201* (2013.01)

(58) Field of Classification Search
CPC .... B64C 3/56; B64C 3/38; B64C 3/40; B64C 27/26; B64C 39/024; B64C 39/008; B64C 31/032; B64C 2201/102; B64C 2201/028; B64C 2201/084; B64C 2201/128; B64C 2201/00; B64C 1/22; B64C 17/00; A63H 27/007; A63H 27/008; F42B 15/105; F42B 10/14

See application file for complete search history.

(56) References Cited

U.S. PATENT DOCUMENTS 1,309,961 A    7/1919  Rippenbein
1,730,249 A *  10/1929  Smith .................. B64C 3/56
                                              244/218

(Continued)

FOREIGN PATENT DOCUMENTS

CN        203698648        7/2014
CN        203698650        7/2014

*Primary Examiner* — Medhat Badawi
*Assistant Examiner* — Vicente Rodriguez
(74) *Attorney, Agent, or Firm* — Jordan IP Law, LLC; Todd A. Vaughn

(57) ABSTRACT

The present invention provides a foldable wing which comprises a wing supporting skeleton, a sliding rail, a skin supporting rib, a skin and a wing movement unit. The wing supporting skeleton comprises a horizontal beam, a longitudinal beam, a wing front edge beam, a wing trailing edge beam, a fixture connector and a sliding block, The wing supporting skeleton is a triangular girder for maintaining planar and sectional shapes of the foldable wing, supporting the skin supporting rib and the skin, and sustaining an aerodynamic load from the skin and a load of a fuselage. After the triangular girder is subjected to a force of the wing movement unit, a shape and an area of the triangular girder are changed so as to achieve folding and unfolding of the foldable wing. A rotocraft and a glider using the foldable wing are also provided.

12 Claims, 12 Drawing Sheets

(51) Int. Cl.
*B64C 27/26* (2006.01)
*B64C 31/032* (2006.01)
*B64C 39/02* (2006.01)

(56) References Cited

U.S. PATENT DOCUMENTS

| | | | | |
|---|---|---|---|---|
| 2,448,392 | A | * | 8/1948 | Quady ................ B64C 29/0033 244/66 |
| 3,185,412 | A | * | 5/1965 | Rogallo ................ B64C 31/032 244/1 R |
| 5,884,863 | A | * | 3/1999 | Fisher ................ B64C 31/0285 244/13 |
| 5,934,967 | A | * | 8/1999 | Brown ................ A63H 27/007 244/46 |
| 2004/0217230 | A1 | * | 11/2004 | Fanucci .................... B64C 3/40 244/46 |
| 2006/0118675 | A1 | * | 6/2006 | Tidwell .................... B64C 3/40 244/123.1 |
| 2006/0144992 | A1 | | 7/2006 | Jha et al. |
| 2010/0282897 | A1 | * | 11/2010 | de la Torre ........... B64C 39/024 244/49 |

* cited by examiner

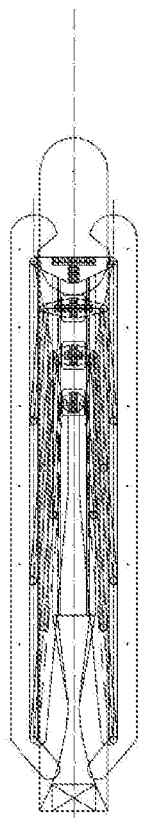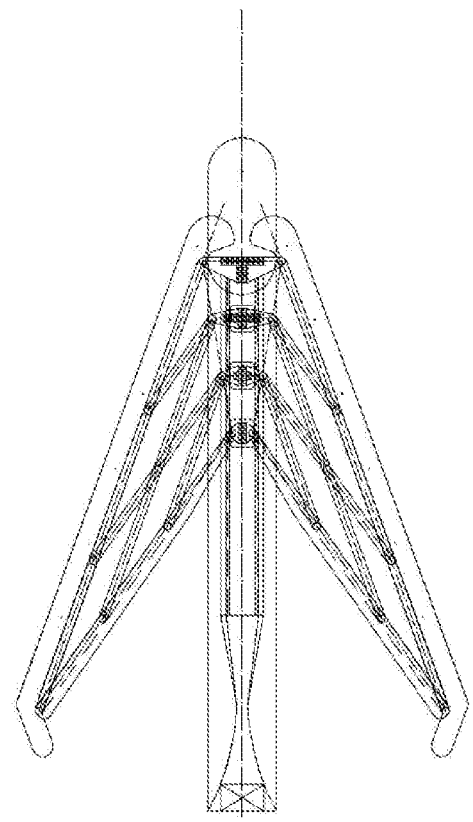
Figure 2
Figure 3
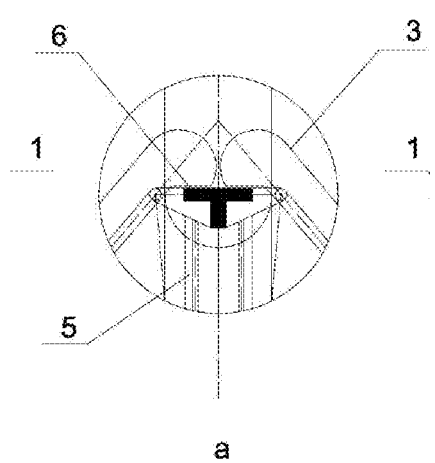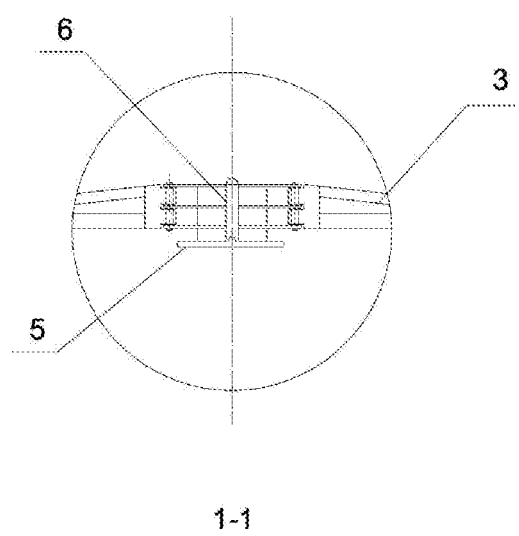
a
Figure 4
1-1
Figure 5

A-A

B-B

FOLDABLE WING AND ROTOCRAFT AND GLIDER USING THE SAME

CROSS-REFERENCE TO RELATED APPLICATIONS

This application is based upon and claims priority to Chinese patent application No. 201620324195.X, filed on Apr. 5, 2016, and Chinese patent application No. 201610830956.3, filed on Sep. 3, 2016, the entire contents of which are incorporated herein by reference.

TECHNICAL FIELD OF THE INVENTION

The present invention relates to the field of aerotechnology, and more particularly to a foldable wing and aircrafts comprising the foldable wing.

BACKGROUND OF THE INVENTION

A wing is an important part of an aircraft. The major function of the wing is to generate an elevating force to support the aircraft to fly in the air. A currently existing wing is mainly composed of a wing inner supporting skeleton and a surface skin, the inner supporting skeleton forms a girder, of which the shape is fixed, by longitudinal beams and horizontal beams, to maintain the sectional shape of the wing, support the surface skin, and sustain an aerodynamic load transmitted from the skin; the surface skin is used to maintain the shape of the wing, thus transmitting an aerodynamic force of the wing to the wing supporting skeleton.

The areas of the existing fixed wing aircrafts are basically unchanged, and the shapes of the wings are unchangeable either once determined. Therefore, the fixed wing aircrafts take up larger space when being parked on the ground. In order to reduce the space taken, the wings of some aircrafts can be partly folded, e.g., the shipboard aircrafts on aircraft carriers. In order to reduce the space taken during storage, some mini aircrafts rotate to unfold during flight by rotation of the wings and superposition of the fuselages, e.g., some mini unmanned planes. However, none of these methods can change the area of the wing, and they are limited by many requirements and cannot be used extensively. The current technology, on the one hand, cannot reduce the space occupied by folding the wings during parking and storage, and on the other hand, can unfold the wings in flight and expand the area so that the wings can generate a sufficient elevating force to support the aircrafts to fly in the air.

SUMMARY OF THE INVENTION

The object of the invention is to provide a wing of which a wing supporting skeleton and a wing skin can fold, thereby realizing folding of the wing when an aircraft is parked and stored, in which way, less space is occupied. The wing of the aircraft is unfolded during usage, and the area of the wing expands accordingly to form a wing that can generate an elevating force and undertake a load to support the aircraft to fly in the air.

The embodiment of the present invention provides a foldable wing comprising a wing supporting skeleton, a sliding rail, a skin supporting rib, a wing skin and a wing movement unit, wherein the wing supporting skeleton can fold and drive the skin supporting ribs and the surface skin to move synchronously to achieve the object of unfolding the wing. The wing supporting rib is a triangular girder and composed of a plurality of longitudinal beams and horizontal beams with different lengths and heights and a sliding rail by connecting to one another via hinges and a mode of sliding connection, wherein the girder is used to maintain planar and sectional shapes of the wing, support the skin supporting ribs and the surface skin, and sustain aerodynamic load transmitted from the skin and the load of the fuselage; wherein one of the longest longitudinal beams is the wing front edge beam, and one of the longest horizontal beams is the wing trailing edge beam.

Further, the sliding rails are root beams of the wing which connect the body of the aircraft and the triangular girder of the wing, the sliding blocks are components restricted by a slot of the sliding rails and can slide along the sliding rails. The wing roots of the wing front edge beam are connected to the fixture connectors of the fronts of the sliding rails by hinges, and can rotate about the hinge joints but cannot slide along the sliding rails. Other nodes of the wing roots of the triangular girder are connected to the respective sliding blocks restricted by the slot of the sliding rails. The sliding blocks can slide along the sliding rails when a force is imposed upon the wing movement unit, thereby changing the length of the wing root edge of the triangular girder, driving the triangular girder to deform, changing the shape and area of the triangle, and realizing the object of folding and unfolding of the wing.

Further, in order to allow the wing supporting skeleton to be parallel to the fuselage when folded, the space occupied is further reduced. Fixed short arms of which the lengths are determined by calculation are extended from the fixture connectors and respective sliding blocks, wherein the fixed short arms connected to the wing front edge beam by hinges are longest, the fixed short arms connected to the wing trailing edge beam by hinges are shortest, and the respective nodes of the wing roots of the triangular girder are connected to the corresponding fixed short arms by hinges.

Further, according to the thickness and width of the wing front edge, the wing front edge beam is made into a shape in compliance with aerodynamics so that the strength thereof can be increased and the satisfactory aerodynamic shape of the wing front edge can be maintained. The wing roots of the front edge beam are further extended into the fuselage from the hinge joints so that the fronts of the wing roots have a satisfactory aerodynamic shape and the resistance to bending and twisting can be enhanced by the strength of restriction of the fuselage.

Further, the wing trailing edge beam takes the advantage of the thickness and width of the wing trailing edge to form a bottom of the triangular girder with sufficient strength. The wing tip part of the trailing edge beam and the wing tip part of the front edge beam are connected by hinges, and the wing root part is connected to the sliding blocks by hinges.

Further, the horizontal beam and the longitudinal beam are within the triangular girder, and are connected by hinges to one another along the direction of the thickness of the wing. The ends of each beam are respectively connected to the front edge beam, the trailing edge beam, the sliding rails and the sliding blocks.

Further, the skin supporting ribs are components that form the aerodynamic shape of the longitudinal section of the wing and connected with the wing folded skin. Multiple groups of the skin supporting ribs support the skins to form a wing outer surface according to the aerodynamic shape. Each group of the skin supporting ribs are composed of upper and lower ribs which are respectively located on the upper surface and the lower surface of the triangular girder of the wing. The fronts of each group of the skin supporting ribs are connected to the wing front edge beam by hinges.

The backs of the upper and lower ribs are connected. When the wing is unfolded, the skin supporting ribs overlap on the upper and lower surfaces of the triangular girder of the wing to transmit the sustained aerodynamic load of the wing skin to the wing supporting skeleton.

Further, the wing skin is connected to the wing supporting ribs, and adhered to the surfaces of the wing front edge and the wing supporting ribs. The wing skin is made of a foldable flexible material. When the wing is folded, the wing skin is folded accordingly. When the wing is unfolded, the wing skin is unfolded and tightened by stretching of the triangular girder of the wing and the wing supporting rib to form the wing outer surface and sustain the aerodynamic load by utilizing the tension of the wing skin material.

Further, the wing movement unit is a unit that can drive a wing to unfold or fold. The form of the unit is related to its state of use. If the wing is folded only for the purpose of occupying less space during storage, the wing can be unfolded before use either by hand or mechanically. If the wing is unfolded after the aircraft takes off, the wing can be unfolded by pulling with a parachute or with a mechanical unit. If the aircraft is used repetitively, the wing can be folded by hand or mechanically when the aircraft finishes its flight and lands.

According to another embodiment of the present invention, a skin supporting rib is composed of upper and lower ribs, the fronts of which are connected to the wing front edge beam by hinges, and the backs of which are connected to form a complete tail tip and tail-tip-free sliding blocks and form and maintain a longitudinal section of the aerodynamic shape of the wing. A plurality of the skin supporting ribs and the wing supporting skeleton jointly form a complete aerodynamic shape of the wing and sustain the load from the skin.

Further, the skin is adhered to the outer surface of the skin supporting ribs and the wing front edge beam, thus forming the outer surface of the wing and sustaining the aerodynamic load o the aircraft in flight. The skin is divided into a wing upper surface skin and a wing lower surface skin, which are respectively connected to the lower ribs and the upper ribs of the skin supporting ribs. The skin and the skin supporting ribs are connected in a mode of sliding. When the wing deforms, the upper and lower surface skins respectively slide along the surfaces of the lower rib and the upper rib under restraint of the skin supporting ribs to accommodate the tension sustained by the skin when the wing deforms.

Further, when the wing supporting skeleton is folded, the skin and the skin supporting ribs connected therewith are driven to fold. The horizontal spacing between each group of the skin supporting ribs is reduced, and the distance of the diagonal line is increased. By restricting the skin supporting ribs, the skin slides along the surface of the skin supporting ribs, and the tail tip part of the skin supporting ribs extend beyond the skin, thereby preventing the skin from being subjected to undue tension when the wing is folded. When the wing supporting skeleton is unfolded, the skin and the skin supporting rib connected therewith are driven to unfold. The horizontal spacing between each group of the skin supporting ribs increases, and the diagonal distance decreases. The skin slides along with the surface of the skin supporting ribs, is gradually unfolded and tightened, and the tail tip parts of the skin supporting ribs that extend beyond the skin are retracted to the design position.

Further, the skin inner tension cable assists stretching, i.e., an inner tension cable, one end of which is connected to a wing root, and the other end of which is connected to a wing tip, is used to connect in the middle in series the tail tips of each group of the skin supporting ribs and the respective connecting points of the upper and lower surface skins at the wing trailing edge. When the wing is folded, the inner tension cable is relaxed, thus not causing tension to the skin. When the wing is unfolded, the inner tension cable is tightened, and the skin is tightened towards the tail tips of the skin supporting ribs with the tail tips of each group of the skin supporting ribs as the supporting points and the respective connecting points on the skin as the pulling points.

Further, the skin outer tension cable assists tension, i.e., an outer tension cable, one end of which is connected to a wing root, and the other end of which is connected to a wing tip, is used to connect in the middle in series the respective connecting points of the upper and lower surface skins at the wing trailing edge. When the wing is folded, the outer tension cable is relaxed, not causing tension to the skin. When the wing is unfolded, the outer tension cable is tightened, and the respective connecting points on the skin are pulled to tighten the skin towards the tail tips of the skin supporting ribs.

According to a further embodiment of the present invention, no slide connection is established between the skin supporting ribs and the skin, the skin is adhered to outer surface of the wing front edge beam and the skin supporting ribs to form a wing outer surface, positioning cable connection is established between each group of the skin supporting ribs, the positioning cable determines the positions between them after the wing is unfolded, when the wing is folded, the skin is relaxed, and after the wing is unfolded, the skin is stretched and tightened.

Further, cable can be used for point connection between the skin and the skin supporting ribs, wherein the connection enables the skin to move orderly along with the skin supporting ribs when the wing is folded or unfolded.

Another object of the present invention is to apply a foldable wing of the invention to a rotocraft, thereby combining the rotocraft with the fixed wing aircraft, forming a double-mode rotocraft and allowing it to have the advantages of both aircrafts at the same time.

In the present invention, a foldable wing is applied to a rotocraft through technical measures, thus forming a double-mode rotocraft. That is, in the stage when the rotocraft takes off or lands, an elevating force is provided by rotation of the rotor wing, and a vertical takeoff or landing mode is implemented; in the stage when the rotocraft levels off, a flight mode of the fixed wing airplane is implemented.

The foldable wing of the present invention is suitable for helicopters and rotorcrafts that takeoff and land vertically, can be applied to multiple types of unmanned helicopters, mini manned helicopters and mini manned or unmanned rotorcrafts that takeoff and land vertically, and can further be applied to multiple types of unmanned planes, aerocars, glider aircrafts, single aircrafts and so on.

BRIEF DESCRIPTION OF THE DRAWINGS

The present invention is set forth in detail with reference to the drawings.

FIG. 2 is a planar graph of a wing supporting skeleton which is entirely folded.

FIG. 3 is a planar graph of a wing supporting skeleton which is semi-unfolded.

FIG. 4 is a planar graph of node a.

FIG. 5 is a cross-sectional graph of node 1-1.

DETAILED DESCRIPTION OF THE EMBODIMENTS

Figure 1:
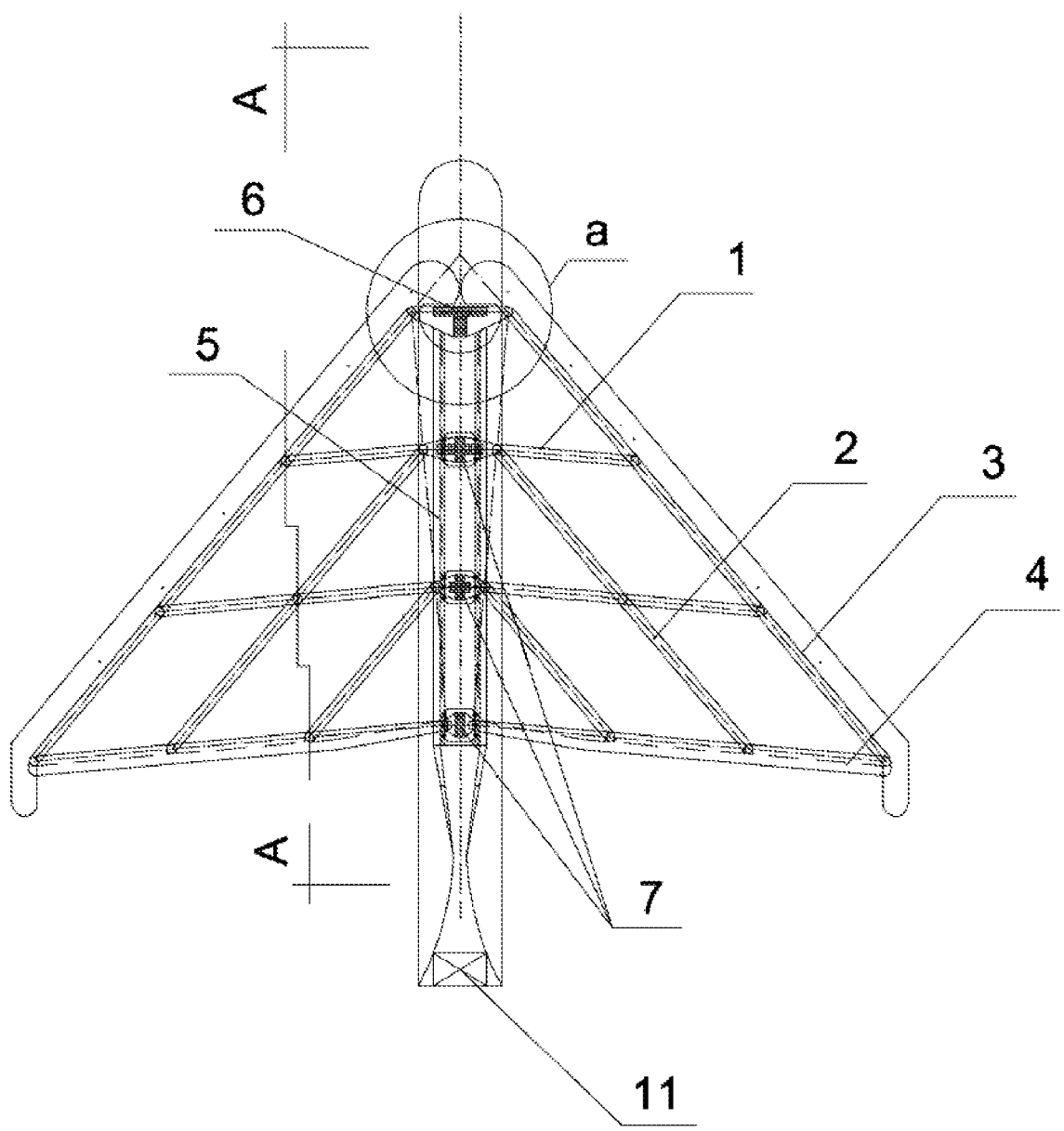
FIG. 1 is a planar graph of a wing supporting skeleton which is entirely unfolded.

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 1 is a planar graph of a pair of unfolded foldable wing supporting skeleton, FIG. 2 is a planar graph of a fully folded wing supporting skeleton, and FIG. 3 is a planar graph of a semi-unfolded wing supporting skeleton. The wing supporting skeleton is mainly composed of a foldable supporting skeleton, a sliding rail 5 and a wing movement unit 11.

According to an embodiment of the present invention, the wing supporting skeleton forms a triangular girder as illustrated in FIG. 1 by connecting a plurality of horizontal beams 1 and longitudinal beams 2 with different lengths and heights, a wing front edge beam 3, a beam trailing edge beam 4, a sliding rail 5, fixture connectors 6 and sliding blocks 7 to one another via hinges and by sliding. The girder is used to maintain the planar and sectional shapes of the wing, support the skin supporting rib and the surface skin, and sustain a load of the fuselage and an aerodynamic load from the skin.

The function of the sliding rails 5 is to connect and restrain the sliding blocks 7 so that they can only slide along the sliding rails. Meanwhile, they are wing root beams of the triangular girder of the wing.

The sliding rails 5 are connected to the body of the aircraft and the triangular girder of the wing. The wing roots of the wing front edge beam are connected to the short arms of the fixture connectors 6 via hinges, and can rotate about the hinged points rather than sliding along the sliding rails 5 (see FIG. 4 and FIG. 5). Other nodes of the wing roots of the triangular girder are connected to the short arms of the corresponding sliding blocks 7 via hinges. The sliding blocks 7 are restricted by the sliding rail slot, and can slide along the sliding rails 5 after having been subjected to a force by the wing movement unit 11. Thus, the length of the wing roots of the triangular girder is changed to drive the triangular girder to take the hinge joints of the fixture connectors 6 as the centers and fold or unfold along the sliding rails 5, thereby changing the shape and area of the triangle (see FIG. 2 and FIG. 3) and realizing the objects of folding and unfolding of the wing. It should be understood that the present invention only provides an example of one form despite there are a plurality of forms of mode in which the sliding rails are connected to the sliding blocks.

In order to allow the wing supporting skeleton to be parallel to the fuselage when it is folded and further reduce the space occupied, short arms with a determined length are extended from both sides of the fixture connectors 6 and the sliding blocks 7 to connect with respective nodes at the wing roots of the triangular girder via hinges (see FIG. 4 and FIG. 5).

Figure 6:
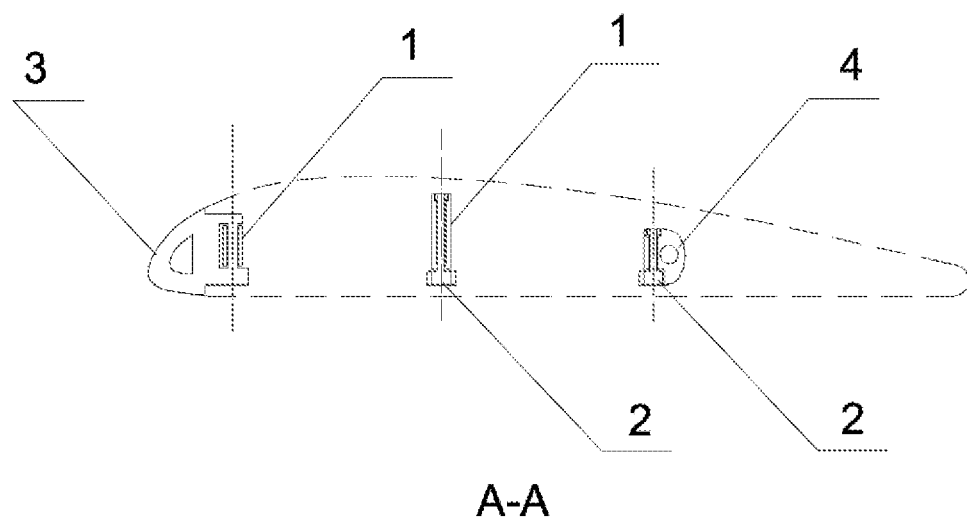
FIG. 6 is a cross-sectional graph of A-A.

FIG. 6 is a sectional graph of A-A of a wing supporting skeleton in an embodiment of the present invention, which shows the positional relation between each beam of the wing supporting skeleton, wherein:

The wing front edge beam 3 makes use of the thickness and width of the wing fronts to produce an aerodynamic shape, which can not only enhance its strength, but also maintain the satisfactory aerodynamic shape of the wing front edge. Extending the wing roots of the front edge beam 3 from the hinge joints of the fixture connector 6 into the fuselage (see FIG. 1, FIG. 4 and FIG. 5) can enable the fronts of the wing roots to have a satisfactory aerodynamic shape, and can further strengthen resistance to bending and twisting of the front edge beams by restriction of the fuselage.

The wing trailing edge beam 4 utilizes the thickness and width of the wing trailing edge to make a bottom of the triangular girder with sufficient strength. The wing tip part of the trailing edge beam 4 and the wing tip part of the front edge beam 3 are connected via hinges, and the wing root parts are connected to the short arms of the sliding blocks 7 via hinges (see FIG. 1, FIG. 2 and FIG. 3).

The horizontal beams 1 and the longitudinal beams 2 are within the triangular girder, and are connected along the direction of the wing thickness via hinges with respect to one another with one superposing the other.

Figure 7:
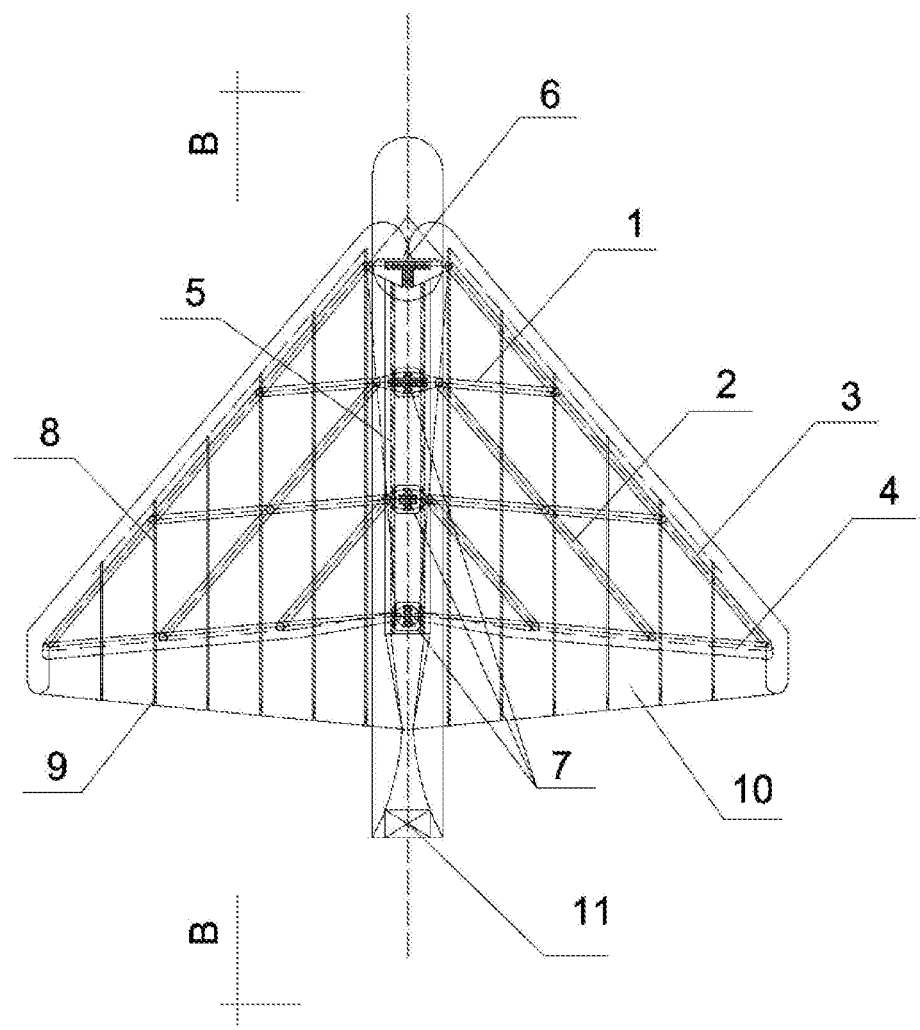
FIG. 7 is a planar perspective graph of an entirely unfolded wing.
Figure 8:
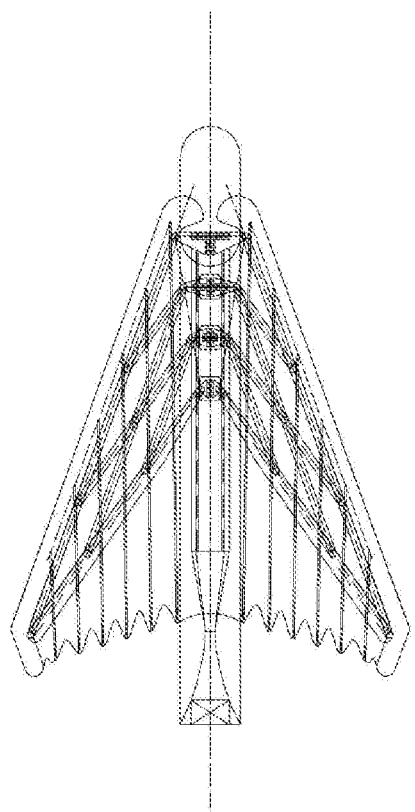
FIG. 8 is a planar perspective graph of a semi-unfolded wing.
Figure 9:
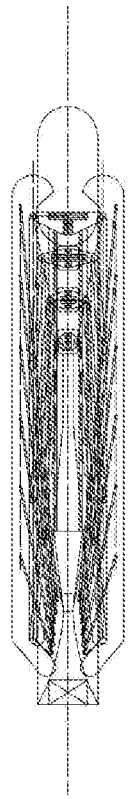
FIG. 9 is a planar perspective graph of an entirely folded wing.

FIG. 7 is a planar perspective graph of an unfolded wing according to an embodiment of the present invention, FIG. 8 is a planar perspective graph of a semi-unfolded wing, and FIG. 9 is a planar perspective graph of a fully folded wing, wherein the skin supporting rib 8 and the tail tip sliding blocks 9 of the skin supporting ribs (hereinafter referred to as tail tip sliding blocks) are members that form the wing longitudinal sectional aerodynamic shape, and the skin 10 is an outer surface of the wing.

Figure 10:
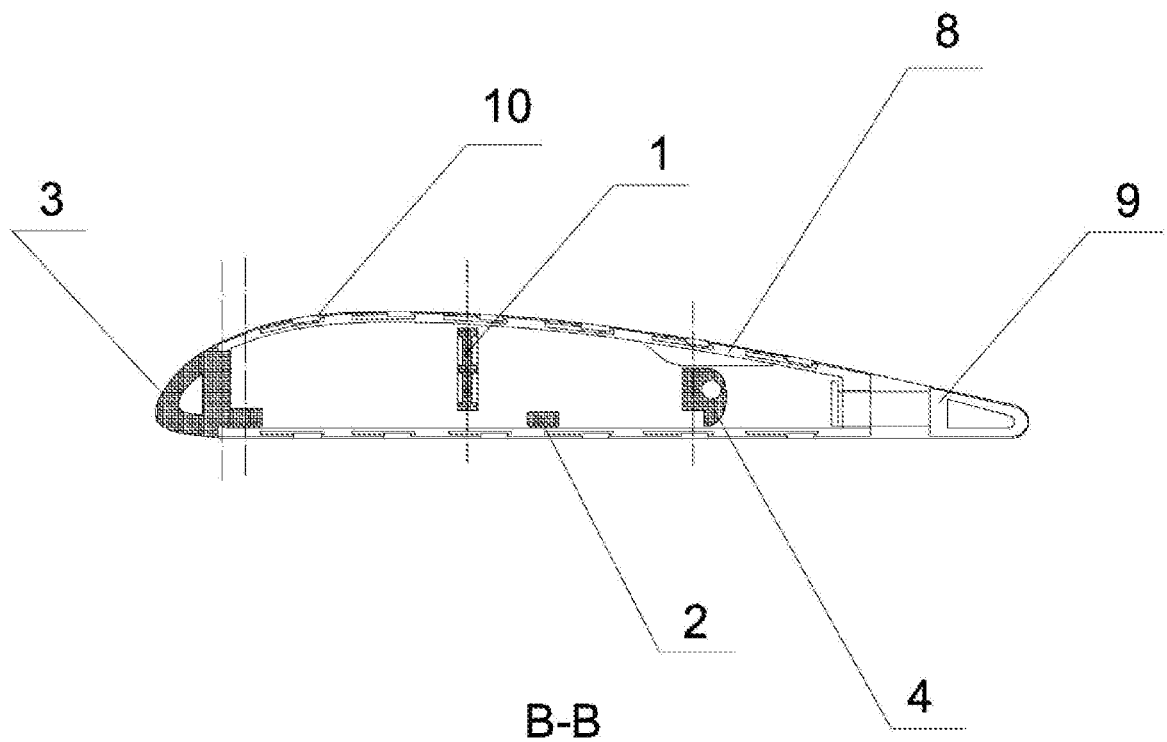
FIG. 10 is a cross-sectional graph of a wing B-B.

FIG. 10 is a sectional graph of B-B of FIG. 7, wherein the relations between the wing supporting skeleton, the skin supporting ribs 8, the tail tip sliding blocks 9 and the skin 10 are shown. Therein, the skin supporting ribs 8 mainly have the following functions: forming and maintaining a longitudinal sectional aerodynamic shape of the wing; connecting and supporting the skin 10, and restricting the skin 10 to move along a designed route when the wing is folded and unfolded; tightening the skin 10 driven by the wing supporting skeleton so that it can sustain an aerodynamic force; accepting an aerodynamic load transmitted from the skin 10 and transmitting it to the wing supporting skeleton; when the wing is folded and unfolded, the tail tip sliding blocks 9 slide by restriction of the skin supporting ribs 8, wherein the length of the skin supporting ribs 8 can be increased or decreased to accommodate the stretching state of the skin when the wing is folded and unfolded.

Multiple groups of skin supporting ribs support the skin to form the wing outer surface. Each group of the skin supporting ribs are composed of upper and lower ribs which are respectively located on the upper surface and the lower surface of the triangular girder of the wing. Each group of the fronts of the skin supporting ribs and the wing front edge beam 3 are connected by hinges. The backs of the two ribs are connected so that, when the wing is unfolded, the skin supporting ribs 8 overlap on the upper and lower surface of the triangular girder of the wing, and transmit an aerodynamic load undertaken by the wing skin to the wing supporting skeleton (FIG. 10). In order to form an aerodynamic shape of the longitudinal section of the wing, the length of the skin supporting ribs 8 tail should be longer than the wing trailing edge beam 4.

The wing skin 10 is connected to the skin supporting ribs 8 and the tail tip sliding blocks 9, and is adhered to the wing front edge beam 3 and the surface of the wing supporting ribs to form a wing outer surface (FIG. 10). The wing skin 10 is made of a foldable flexible material which should have the properties of light weight, thin thickness, strong tensile strength, small deformation and the like. When the wing is folded, the wing skin 10 slides along the skin supporting ribs 8 and folds accordingly. When the wing is unfolded, the wing skin 10 is unfolded and tensioned by pulling of the triangular girder of the wing and the wing supporting ribs 8, thereby forming an outer surface of the wing and sustaining the aerodynamic load of the air by utilizing the tensile force of the wing skin material.

Figure 11:
FIG. 11 is a monoline schematic graph of a short-arm rotary-wing supporting skeleton when it is entirely folded.
Figure 12:
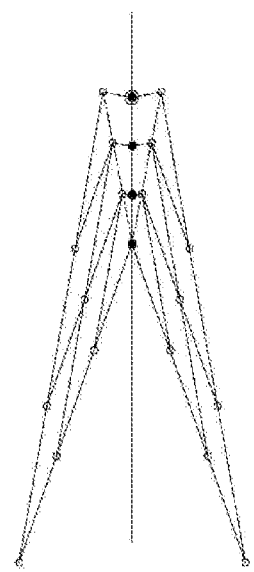
FIG. 12 is a monoline schematic graph of a short-arm rotary-wing supporting skeleton when it is semi-unfolded.
Figure 13:
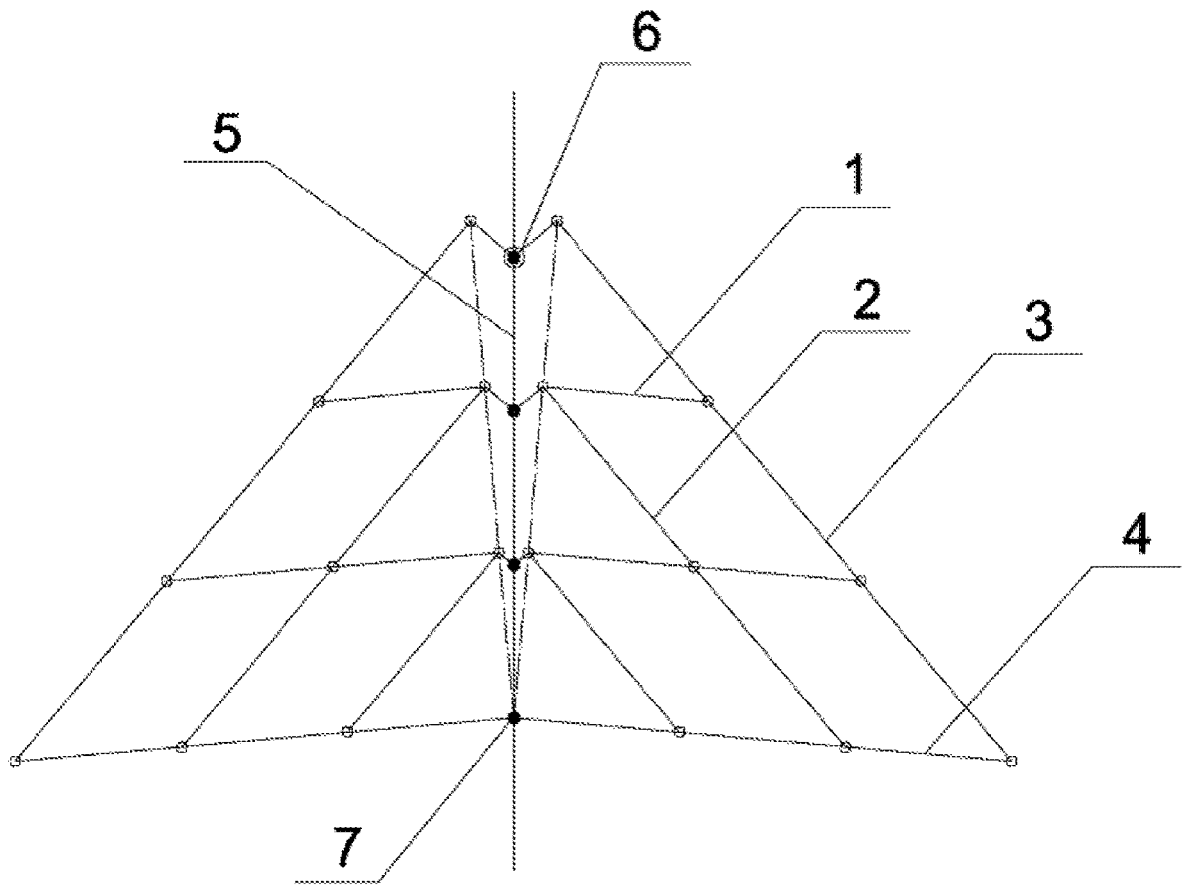
FIG. 13 is a monoline schematic graph of a short-arm rotary-wing supporting skeleton when it is entirely unfolded.

The wing movement unit 11 is a unit that unfolds or folds the wing, and the specific form of the unit is related to its state in use. If the wing is folded only for the purpose of occupying less space during storage, the wing can be unfolded before use either by hand or mechanically. If the wing is unfolded after the aircraft takes off, the wing can be unfolded by pulling with a parachute or with a mechanical unit, or by pulling with a parachute and with a mechanical unit, or the like. If the aircraft is used repetitively, the wing can be folded by hand or mechanically when the aircraft lands. According to the requirements, the wing movement unit 11 can be placed in the front of the sliding rail or at the back of the sliding rail. The wing movement unit 11 shown in the figures is a post positive schematic diagram. The wing supporting skeleton has two forms. With respect to the wing supporting skeleton set forth above, the short arms and the fixture connectors 6 are integrated, and the short arms and the sliding blocks 7 are integrated. When the sliding blocks 7 slide along the sliding rails 5, the short arms would not rotate. The wing folded skeleton according to another embodiment of the present invention is as illustrated in FIG. 11, FIG. 12 and the FIG. 13. The short arms and the fixture connectors 6 are not integrated, and the short arms and the sliding blocks 7 are not integrated. The short arms are extensions of the longitudinal beams 2 and the front edge beam 3. The top of the short arms is connected to a central point position between the fixture connectors 6 and the sliding blocks 7 via hinges. When the sliding blocks 7 move along the sliding rails 5, the triangular girder is driven to deform with the hinges between the extended short arms and the front edge beam 3 with respect to the fixture connectors 6 as the centers along the sliding rails 5, thereby achieving the objects of folding or unfolding. In the process that the sliding blocks 7 slide, the short arms serve as extensions of the beams and rotate along with the beams.

The foldable wing according to an embodiment of the present application can be used both as an aircraft wing and as an aircraft vertical tail and horizontal tail. According to the above embodiment, there is one slide rail 5, which is employed as both slide rail and wing root beam for wings at both side. Based on the same principle, the number of the slide rail 5 may be two, and they are placed on both sides of the aircraft body, and employed as the wing slide rail and wing root beam respectively at one side of the aircraft.

According to another embodiment of the present application, the tail tip sliding block 9 is eliminated, so that the structure of the skin supporting rib 8 is simplified, and the following is a solution of this embodiment.

Figure 15:
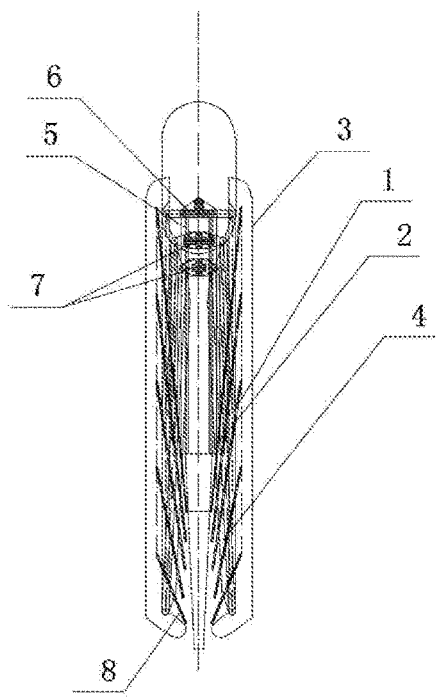
FIG. 15 is a planar perspective graph of a structure when the wing is folded.
Figure 16:
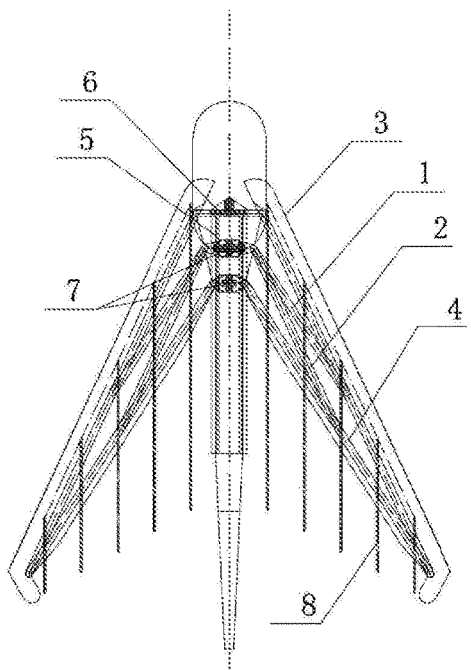
FIG. 16 is a planar perspective graph of a structure when the wing is semi-unfolded.
Figure 17:
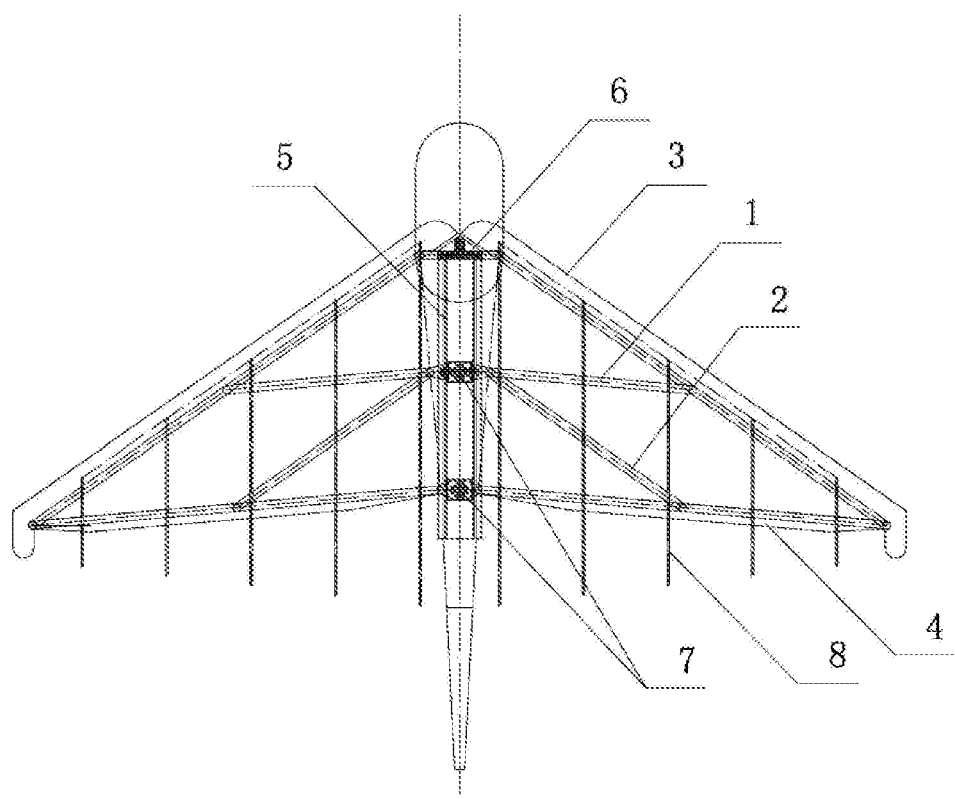
FIG. 17 is a planar perspective graph of a structure when the wing is fully unfolded.

FIG. 15 is a structural perspective view of the wing according to another embodiment of the present application in a folded state, FIG. 16 is a structural perspective view of the wing of this embodiment in a semi-unfolded state, and FIG. 17 is a structural perspective view of the wing of this embodiment in completely unfolded state. In these figures, the wing support frame includes a transverse beam 1, a longitudinal beam 2, a wing leading edge beam 3, a wing trailing edge beam 4, a sliding rail 5, a fixed connecting member 6, a sliding block 7, these components constitute a triangular truss by means of hinge joints and sliding connections (the numbers of transverse beam 1 and longitudinal beam 2 can increase or decrease according to the requirement of the wing), and the triangular truss is used to maintain the planar and cross-sectional shape of the wing, to support the skin supporting ribs and the surface skin, to withstand the aerodynamic load transmitted from the skin and the fuselage load, and the truss can be folded and drive the skin supporting ribs and surface skin to act synchronously to achieve the folding and unfolding action of the wing. There is no tail slider 9 in this embodiment.

According to the present example, the skin supporting rib 8 consists of an upper rib and a lower rib, and the upper and lower ribs are both connected to the front wing beams 3 at their front ends, and the rear ends of the upper and lower ribs are joined together to form a complete tail tip, there is no tail tip slider 9, so as to form and maintain the aerodynamic profile of the longitudinal section of the wing. A plurality of sets of skin supporting ribs 8 and wing support frames form a complete wing aerodynamic profile.

In particular, the skin is attached to the outer surface of the wing leading edge 3 and the skin supporting rib 8, so as to form the outer surface of the wing, and the skin 10 is divided into an upper surface skin and a lower surface skin, which are respectively connected with an upper rib and a lower rib of the skin supporting ribs 8, and they are slidably connected with the skin supporting ribs 8.

Figure 18:
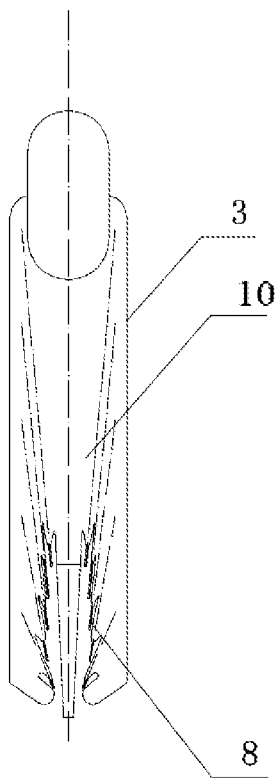
FIG. 18 is a planar graph of a skin stretching form when the wing is folded.
Figure 19:
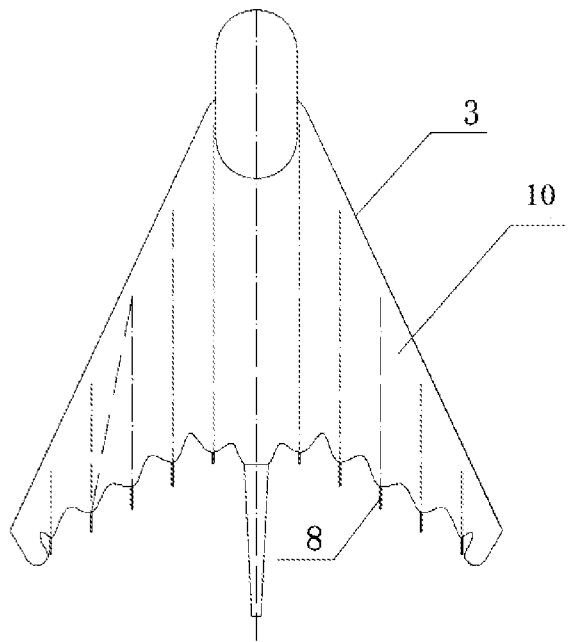
FIG. 19 is a planar graph of a skin stretching form when the wing is semi-unfolded.
Figure 20:
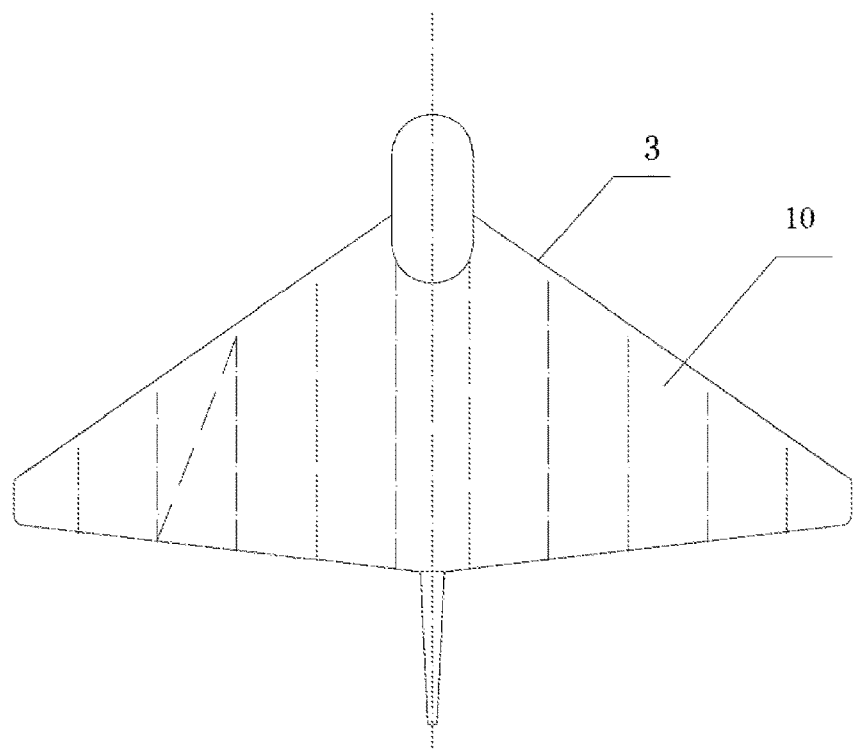
FIG. 20 is a planar graph of a skin stretching form when the wing is fully unfolded.

When the wing is folded, the skin 10 is longitudinally stretched under the restriction of the diagonal length of two neighboring sets of skin supporting ribs, where the upper surface skin and the lower surface skin slide along the upper rib and the lower support rib of the skin supporting ribs 8 respectively, and the part of the skin supporting ribs extending beyond the diagonal length extends out of the skin, as shown in FIG. 18. When the wing is unfolded, the skin 10 is stretched by means of the wing support frame and the skin supporting ribs 8, so the skin 10 extends transversely and longitudinally at the same time. With the restriction of the skin supporting ribs 8, the skin 10 extends longitudinally and slides along upper rib and the lower rib of the skin supporting ribs 8, the part of the skin supporting rib extending beyond the skin 10 retracts gradually into the skin, as shown in FIG. 19. When the wing is fully expanded, the skin horizontally and vertically extend in place, the skin supporting ribs 8 is retracted to the desired position, as shown in FIG. 20.

Figure 21:
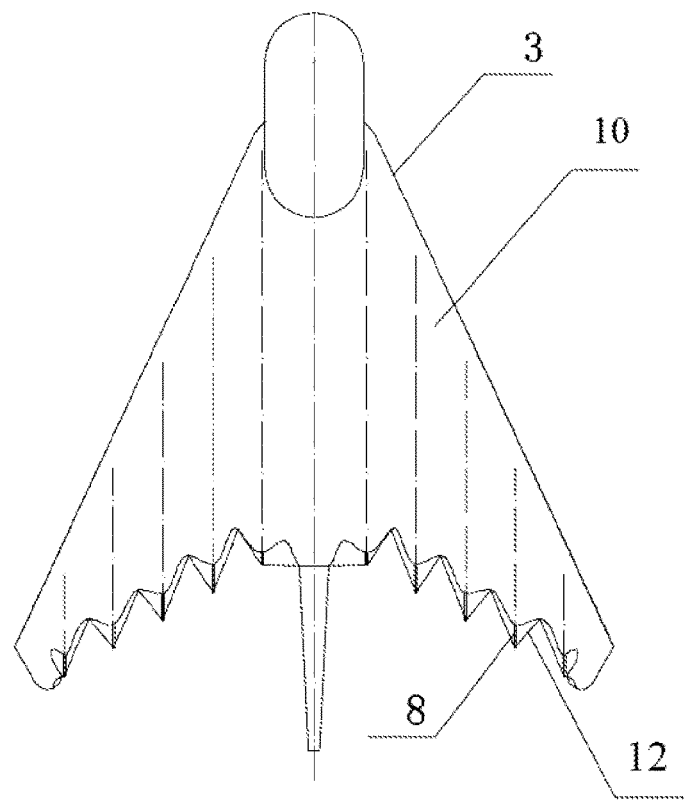
FIG. 21 is a planar graph of a skin inner tension cable in an assisted tension form when the wing is semi-unfolded.
Figure 22:
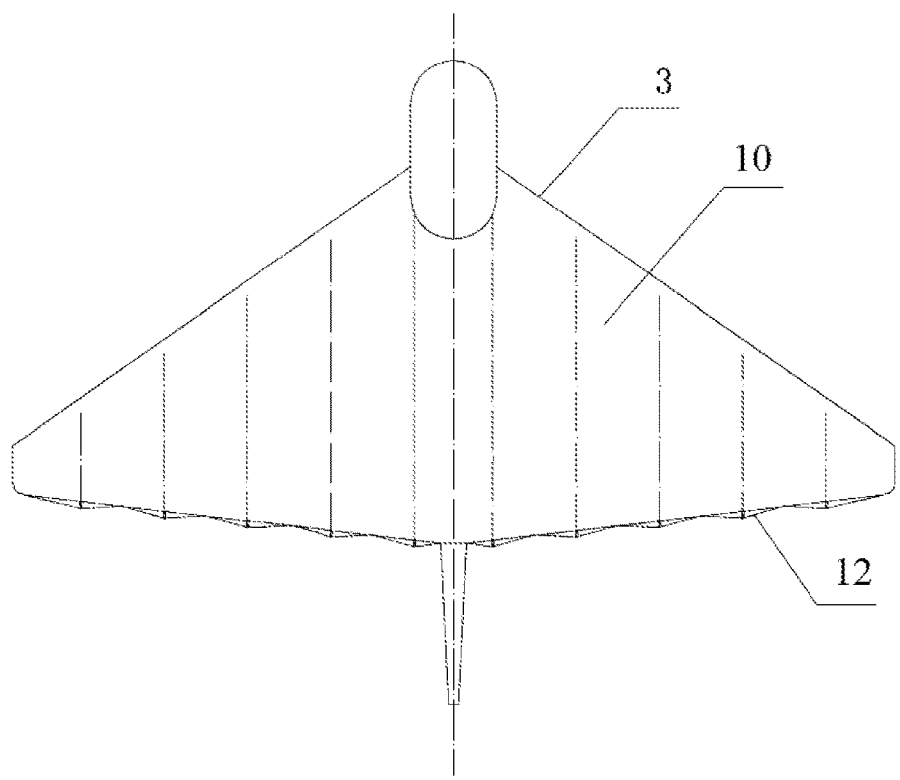
FIG. 22 is a planar graph of a skin inner tension cable in an assisted tension form when the wing is fully unfolded.
Figure 23:
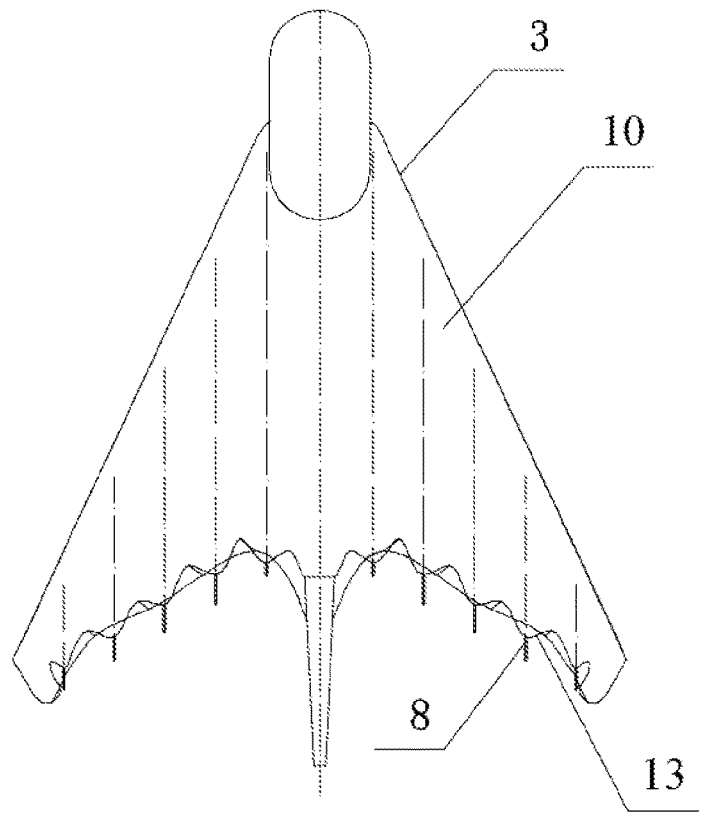
FIG. 23 is a planar graph of a skin outer tension cable in an assisted tension form when the wing is semi-unfolded.
Figure 24:
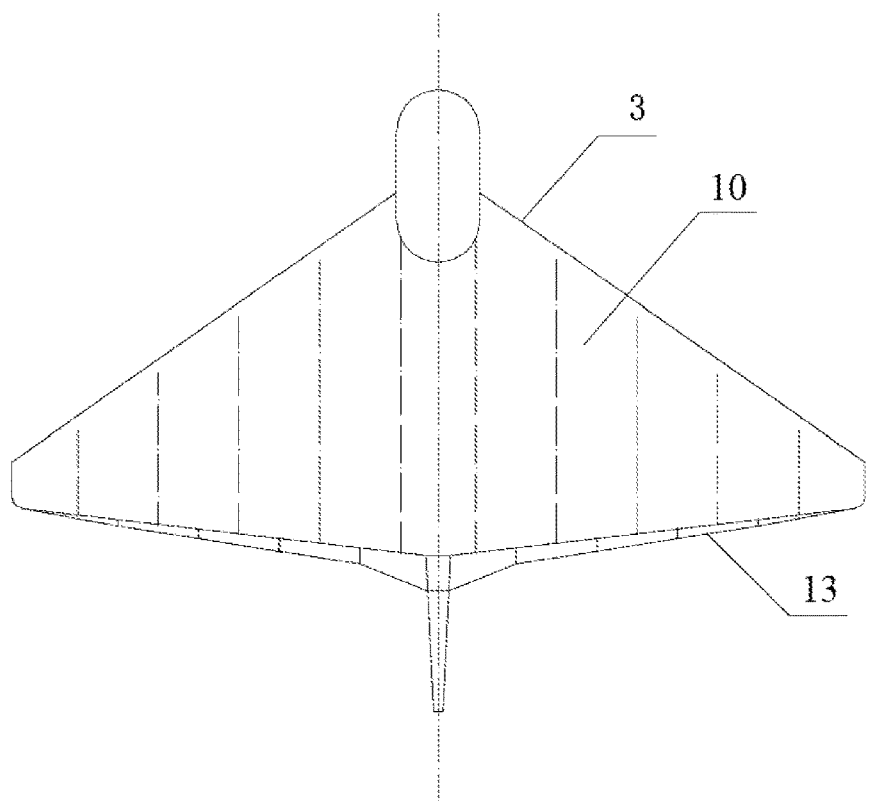
FIG. 24 is a planar graph of a skin outer tension cable in an assisted tension form when the wing is fully unfolded.

By employing a skin inner tension cable to help stretch, the skin can be stretched longitudinally more powerfully when the foldable wing is unfolded. The skin inner tension cable stretch assisting equipment has an inner tension cable 12 which connects to wing root at one end and connects to the wing tip at the other end, and the middle part of the inner tension cable 12 is connected to the tail tip of every skin supporting rib 8 and every connection point of the upper and lower skins located at the trailing edge part of the wing. When the wing is folded, the inner tension cable 12 relaxes and does not draw the skin 10, as shown in FIG. 21. When the wing is unfolded, the inner tension cable 12 is gradually stretched with the expansion of the wing, meanwhile taking the tail tip of each skin supporting rib as the support point and taking each connection point on the skin 10 as pulling point, the upper skin and the lower skins are pulled towards the tail tip of the skin supporting rib 8; after the wing is fully unfolded, the skin 10 is horizontally and vertically stretched in place, as shown in FIG. 22. With the aid of a skin external tension cable to help stretch, the skin can be stretched longitudinally more powerfully when the foldable wing is unfolded. The skin external tension cable stretch assisting equipment has an external tension cable 13 which connects to wing root at one end and connects to the wing tip at the other end, and the middle part of the external tension cable 13 is connected to every connection point of the upper and lower surface skins located at the trailing edge part of the wing. When the wing is folded, the external tension cable 13 relaxes and does not stretch the skin 10, as shown in FIG. 23. When the wing is unfolded, the external tension cable 13 is gradually stretched with the expansion of the wing, meanwhile each connection point on the skin 10 located at the trailing edge of the wing is pulled and the upper skin and the lower skins are pulled towards the tail tip of the skin supporting rib 8; after the wing is fully unfolded, the skin 10 is horizontally and vertically stretched in place, as shown in FIG. 24.

The foldable wing according to this embodiment has the following advantages: with removal of tail block 9, the structure of the foldable wing is optimized; after removal of the tail block 9, the structure of the skin supporting rib 8 is more complete, which can increase the strength thereof; by means of inner tension cable assistant stretching equipment or external tension cable assistant stretching equipment, the longitudinal stretching of the skin during the expansion of the foldable wing can be promoted, which is beneficial to the tensioning of the surface skin after the expansion of the wing.

Figure 25:
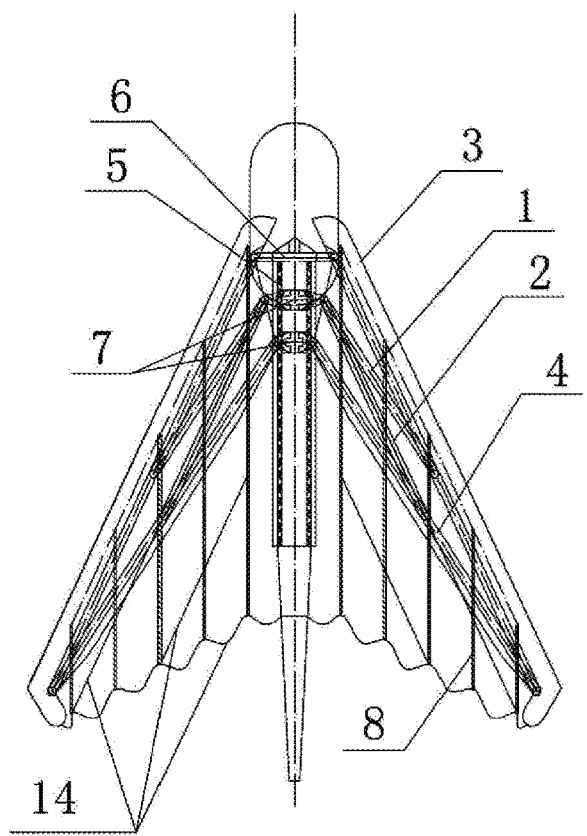
FIG. 25 is a planar perspective graph of a structure of a semi-unfolded wing with a positioning cable.
Figure 26:
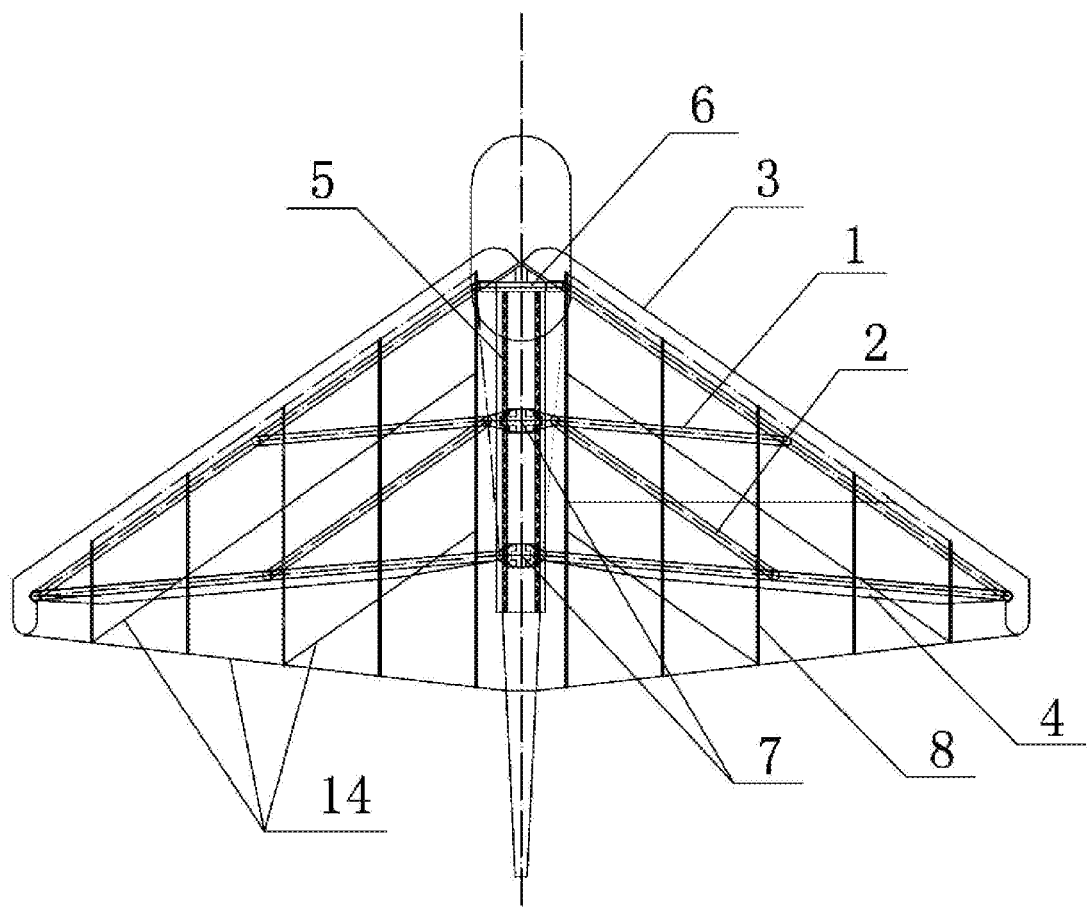
FIG. 26 is a planar perspective graph of a structure of a fully unfolded wing with a positioning cable.
Figure 27:
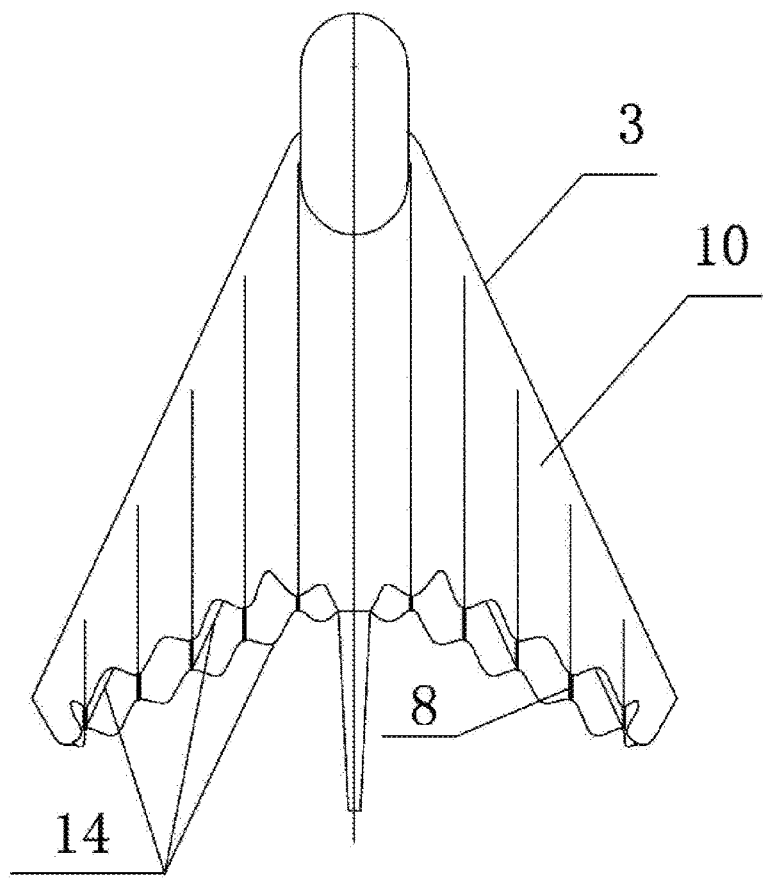
FIG. 27 is a planar graph of a semi-unfolded wing with a positioning cable.
Figure 28:
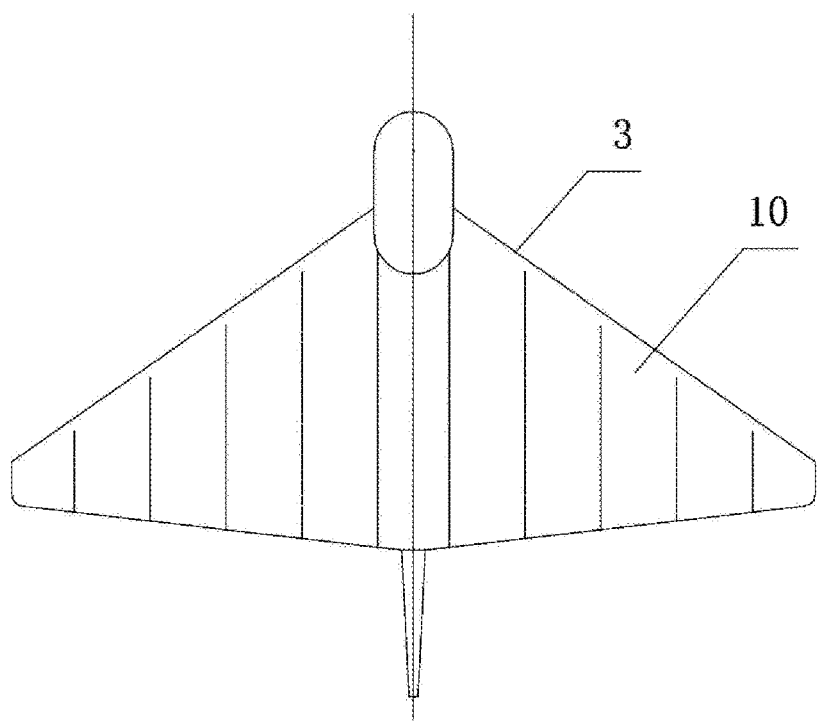
FIG. 28 is a planar graph of a fully-unfolded wing with a positioning cable.

According to a further embodiment of the present invention, no slide connection is established between the skin supporting ribs 8 and the skin 10, the skin 10 is adhered to outer surface of the wing front edge beam 3 and the skin supporting ribs 8 to form an outer surface of the wing, positioning cable 14 connection is established between each group of the skin supporting ribs (FIG. 25 and FIG. 26), the positioning cable 14 determines their positions between the respective group of the skin supporting ribs when the wing is unfolded, when the wing is folded, the skin 10 is relaxed (FIG. 27), and after the wing is unfolded, the skin 10 is stretched and tightened.

Further, cable can be used for point connection between the skin 10 and the skin supporting ribs 8, wherein the connection enables the skin 10 to move orderly along with the skin supporting ribs 8 when the wing is folded or unfolded.

The embodiment simplifies the connection between the skin supporting ribs 8 and the skin 10.

In general, the foldable wing has both an upper surface skin and a lower surface skin, in particular case, the foldable wing only has the upper surface skin.

The foldable wing according to the embodiments of the present application has the following advantages:

1. It has the function of changing the shape and area for the same set of wings based on the requirement for use.

2. The volume of the folded wing is much smaller than that the unfolded wing, when it is arranged on an aircraft, the aircraft will have reduced storage and launch space, so as to achieve the integration of aircraft storage and launch, this aircraft has greater flexibility.

3. After the aircraft lifts off, the folded wing unfolds, and the wing area increases by several times, thereby it can produce greater lift force, carry larger load, and increase the ability of the aircraft.

4. It can be used for different types, different specifications of aircraft.

The foldable wing provided by the embodiments of the present application can be implemented in many fields, for example:

1. Single gliding wing—the foldable wing in folded state is carried on a glider (gliding athlete) so as to keep the minimum occupied space. By taking a take-off mode of jumping down from a high-altitude position, the gliding athlete unfolds the wing to form a glider wing before taking off. By using an airplane to airdrop the glider to fly, the glider draws the folded wing by a rope to unfold it to form a glider wing when he/she jumps off the airplane.

2. Unmanned plane—for usual storage and transportation, the unmanned plane wing can be folded before storage, so as to take up minimum space, according to the need, the wing can be unfolded before or after the unmanned plane takes off, then it forms a fixed-wing airplane to fly; such unmanned plane can be applied to the ground or ship take-off, or aircraft to airdrop and fly.

3. Dual-mode helicopter based on foldable wing: the foldable wing is installed on a helicopter body to form a dual-mode helicopter, i.e.: in the take-off stage and landing stage of the helicopter, the wing is folded and furled onto the fuselage, the main rotor wing of the helicopter provides lift force, so the helicopter can vertically lift or vertically land. When the helicopter flies horizontally in the air, the foldable wing is unfolded to form a fixed wing, and the main rotor engine is closed, therefore the main rotor wing is in a free rotation state, and the flight power of the helicopter is provided by another pushing propeller or pulling propeller, and the main lift force is provided by the fixed wing, and this aircraft flied in the fixed-wing flight mode. The dual-mode helicopter based on foldable wing can be applied to single-rotor helicopter and coaxial twin-rotor helicopter.

4. Flight car—on the basis of the dual-mode coaxial twin-rotor helicopter, providing road driving power to an airplane, and the main rotor wing being folded when it is driven on the road, this constitutes a flying car.

Figure 14:
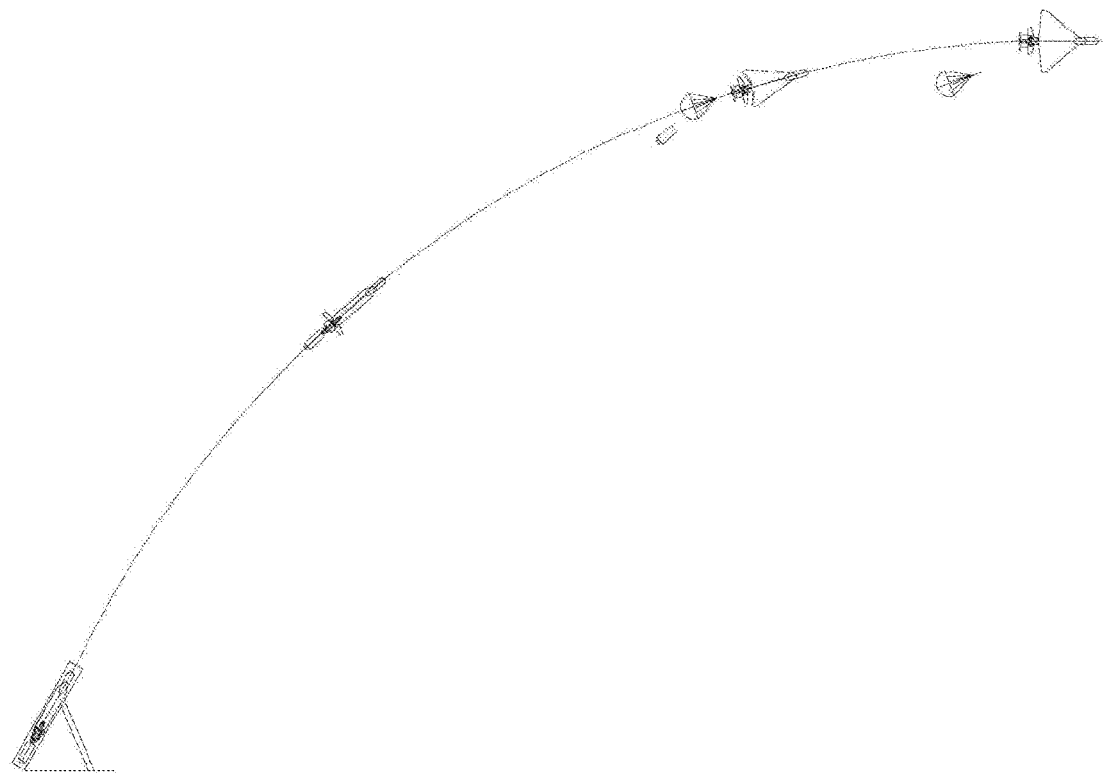
FIG. 14 is a schematic graph of a process of launching an unmanned plane with foldable wings.

FIG. 14 shows a schematic view of a process from storage, launch, lift, wing unfolding, to normal flight of the foldable wing type unmanned plane according to the embodiment of the present application.

What is claimed is:

1. A foldable wing, comprising:
a sliding rail, connected to a fuselage of an aircraft;
a skin supporting rib;
a skin;
a wing supporting skeleton that includes:
    a plurality of horizontal beams,
    a plurality of longitudinal beams,
    a pair of wing front edge beams,
    a pair of wing trailing edge beams configured to: maintain planar and sectional shapes of the foldable wing, support the skin supporting rib and the skin, and sustain an aerodynamic load from the skin and a load of a fuselage,
    a plurality of fixture connectors,
    a plurality of sliding blocks, moveably connected to the sliding rail, the horizontal beams, and the longitudinal beams, and
    a plurality of triangles forming among the plurality of horizontal beams, the plurality of longitudinal beams, the pair of wing front edge beams, and the pair of wing trailing edge beams, wherein the pair of wing front edge beams and the pair of wing trailing edge beams form a largest triangle of the plurality of triangles;
a wing movement unit configured to apply a force to the sliding blocks to move the sliding blocks along the sliding rail and change a shape and an area of the foldable wing to achieve folding and unfolding of the foldable wing,
wherein the sliding rail is connected to the plurality of horizontal beams, the plurality of longitudinal beams, the pair of wing front edge beams, and the pair of wing trailing edge beams via the plurality of fixture connectors and the plurality of sliding blocks.

2. The foldable wing according to claim 1, wherein the skin supporting rib comprises an upper rib and lower rib, fronts of the upper rib and the lower rib are connected with the wing front edge beam via a hinge, and backs of the upper rib and the lower rib are connected with each other to form a complete tail.

3. The foldable wing according to claim 2, wherein the skin is adhered to an outer surface of the skin supporting rib and the wing front edge beam to form an outer surface of the foldable wing, the skin comprises an upper surface and a lower surface, and the upper surface and the lower surface of the skin are respectively connected to the upper rib and the lower rib of the skin supporting ribs, and are slidably with the skin supporting ribs.

4. The foldable wing according to claim 2, further comprising a stretch assisting equipment having an inner tension cable of the skin, wherein an end of the inner tension cable is connected to a wing root, another end of the inner tension cable is connected to a wing tip, a middle part of the inner tension cable is connected to tail tips of each of a plurality of the skin supporting rib in series and each of a plurality of connecting points on an upper surface and a lower surface of the skin at a wing trailing edge of the foldable wing, and
    when the foldable wing unfolds, the inner tension cable is tightened with unfolding of the foldable wing, and the tail tips of the skin supporting ribs act as supporting points and the connecting points on the skin act as pulling points to pull the upper surface and the lower surface of the skin towards the tail tips of the skin supporting ribs.

5. The foldable wing according to claim 2, further comprising a stretch assisting equipment having an outer tension cable of the skin, wherein an end of the outer tension cable is connected to a wing root, another end of the outer tension cable is connected to a wing tip, a middle part of the outer tension cable is connected to each of a plurality of connecting points on an upper surface and a lower surface of the skin at a wing trailing edge of the foldable wing in series, and
    when the foldable wing unfolds, the outer tension cable is tightened with unfolding of the foldable wing, the connecting points on the skin at the wing trailing edge part is pulled, and the upper surface and the lower surface of the skin are stretched towards a tail tip of the skin supporting rib.

6. The foldable wing according to claim 1, wherein the skin is made of a foldable flexible material.

7. The foldable wing according to claim 1, wherein each of the wing front edge beams is hinged to a fixture connector at a wing root end thereof and the wing front edge beam is rotatable around the fixture connector.

8. The foldable wing according to claim 3, wherein when the foldable wing deforms, an upper surface and a lower surface of the skin respectively slide along surfaces of an upper rib and a lower rib of the skin supporting rib under restraint of the skin supporting rib so as to accommodate tension sustained by the skin when the foldable wing deforms.

9. The foldable wing according to claim 3, wherein an upper surface and a lower surface of the skin are connected at a wing trailing edge.

10. The foldable wing according to claim 1, wherein no slidable connection is present between the skin supporting rib and the skin, the skin is adhered to an outer surface of the skin supporting rib and the wing front edge beam.

11. A rotocraft comprising the foldable wing according to claim 1.

12. A glider comprising the foldable wing according to claim 1.

* * * * *